United States Patent
Neubauer et al.

(10) Patent No.: US 7,056,031 B2
(45) Date of Patent: Jun. 6, 2006

(54) METHOD AND DEVICE FOR MANUFACTURING AN OPTICAL FIBER END

(75) Inventors: Stefan Neubauer, Otterstadt (DE); Matthias Woll, Oestringen (DE)

(73) Assignee: Bernhard Schaefer Werkzeug-und Sondermaschinen GmbH, Bad Schoenborn (DE)

( * ) Notice: Subject to any disclaimer, the term of this patent is extended or adjusted under 35 U.S.C. 154(b) by 134 days.

(21) Appl. No.: 10/405,536

(22) Filed: Apr. 2, 2003

(65) Prior Publication Data

US 2003/0206702 A1 Nov. 6, 2003

(30) Foreign Application Priority Data

May 5, 2002 (DE) ................ 102 09 461

(51) Int. Cl.
*G02B 6/36* (2006.01)
(52) U.S. Cl. ............ 385/85; 385/53; 385/76; 385/77; 385/78
(58) Field of Classification Search .......... 385/85
See application file for complete search history.

(56) References Cited

U.S. PATENT DOCUMENTS

| | | | |
|---|---|---|---|
| 3,819,442 A | 6/1974 | Brushenko | 156/180 |
| 4,176,909 A | 12/1979 | Prunier | 350/96.2 |
| 4,422,715 A * | 12/1983 | Williams et al. | 385/85 |
| 4,715,876 A * | 12/1987 | Osaka et al. | 65/407 |
| 5,208,977 A | 5/1993 | Ricard | 29/861 |
| 5,269,206 A | 12/1993 | Yagawa | 81/9.51 |
| 5,999,682 A | 12/1999 | Vincent et al. | 385/134 |
| 6,361,220 B1 * | 3/2002 | Mulligan et al. | 385/85 |

FOREIGN PATENT DOCUMENTS

| | | |
|---|---|---|
| DE | 198 42 122 | 3/2000 |
| DE | 19919428 | 11/2000 |
| GB | 1 604 957 | 12/1981 |

* cited by examiner

*Primary Examiner*—Jennifer Doan
(74) *Attorney, Agent, or Firm*—Davidson, Davidson, Kappel, LLC

(57) ABSTRACT

A method of manufacturing an optical fiber end, provided with a face transparent to light waves, for attaching a ferrule, is described, in which the face is formed by cutting through the optical fiber and mechanical machining and the optical fiber is freed of its outer cladding, which completely encloses the outside of the optical fiber, in the region of an end section, the cutting through of the optical fiber (1) and the mechanical machining of the face (14, 15) being performed as a self-contained work step, which simultaneously includes the cutting through of the optical fiber (1) and the fine machining of the face (14, 15) obtained in this way, and the removal of the outer cladding (21, 22) in the region of the end section (23, 24) only being completed subsequently to this work step.

11 Claims, 6 Drawing Sheets

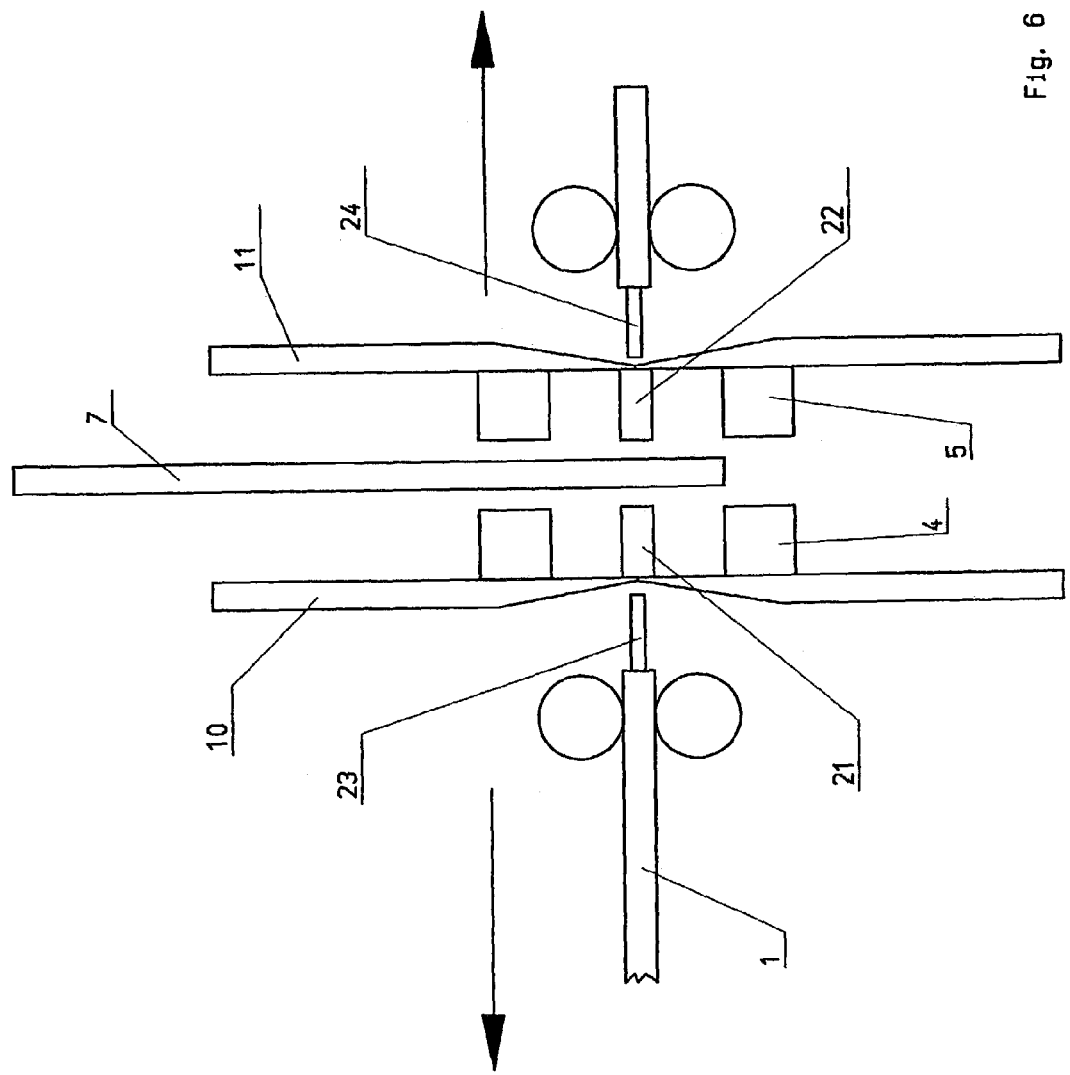

METHOD AND DEVICE FOR MANUFACTURING AN OPTICAL FIBER END

German Patent Application No. 102 09 461.6-51 is hereby incorporated by reference herein.

BACKGROUND INFORMATION

The present invention relates to a method and a device for manufacturing an optical fiber end, provided with a face transparent to light waves, for attaching a ferrule, in which the face is formed by cutting through the optical fiber and mechanical machining and the optical fiber is freed of its outer cladding, which completely encloses the outside of the optical fiber, in the region of its end section.

To connect two optical fiber ends, the faces of the optical fibers are to be brought into position very precisely and held there. The faces are to be positioned exactly in relation to one another in both the radial and the axial directions. Ferrules, which must be placed on the end of an optical fiber, are used for plug-in connections. In this case, the attachment of the ferrule to the optical fiber end must have high tensile strength, without the optical fiber being damaged or its optical properties being influenced at the same time.

The faces of the optical fiber ends must be finished very precisely.

In German Patent Application 199 19 428 A1, which relates to the attachment of a ferrule to cladding of an optical fiber, reference is made to the finishing of the face of the optical fiber, among other things. This finishing is performed after the completely processed end piece of the optical fiber has already been provided with a ferrule. The subsequent finishing is difficult and complex, however.

BRIEF SUMMARY OF THE INVENTION

An object of the present invention is to find a simpler possibility for manufacturing an exact face on an optical fiber end, which also allows a high piece count in the shortest time.

The present invention provides a method of manufacturing an optical fiber end, provided with a face transparent to light waves, for attaching a ferrule, in which the face is formed by cutting through the optical fiber and mechanical machining and the optical fiber is freed of its outer cladding, which completely encloses the outside of the optical fiber, in the region of an end section. The cutting through of the optical fiber (1) and the mechanical machining of the face (14, 15) is performed as a self-contained work step, which simultaneously includes the cutting through of the optical fiber (1) and the fine machining of the face (14, 15) obtained in this way; and the removal of the outer cladding (21, 22) in the region of the end section (23, 24) is only completed subsequently to this work step.

In the method according to the present invention, the optical fiber is cut through and the mechanical machining of the face is performed simultaneously. The outer cladding of the optical fiber is then cut through in a predetermined end section and drawn off of the optical fiber.

A grinding saw blade is preferably used for cutting through the optical fiber and finely machining its face. Using such a grinding saw blade, the optical fiber may be cut through and its faces ground simultaneously. A diamond-impregnated disk is preferably used as a grinding saw blade.

The outer cladding of the optical fiber is cut through in a predetermined end section and then drawn off of the optical fiber with the aid of a shaped blade. The end section of the outer cladding is drawn off through a relative motion of the shaped blade and the holding device for the optical fiber. It is favorable in this case if the holding device which holds the optical fiber performs a backward movement and the end section of the outer cladding is stripped off of the optical fiber by the shaped blade at the same time.

In order to achieve the highest possible piece count per unit of time, a section of predetermined length is drawn off and cut to length from an endless optical fiber. In this case, the faces produced as the section is cut to length are finished simultaneously and the diametrically opposing end sections of the outer cladding are drawn off of both optical fiber ends simultaneously.

The device for performing the method is provided with a clamping device for clamping the optical fiber, a cutting tool for cutting through the optical fiber transversely to its lengthwise direction, which may simultaneously perform the finishing of the faces, and a shaped blade for cutting through the outer cladding of the optical fiber. The cutting tool is provided with two lateral surfaces running parallel to one another, which are capable of finishing the faces and may be guided along the faces. The cutting tool is preferably formed by a milling and/or grinding tool. This cutting tool may be moved back and forth transversely to the lengthwise direction of the optical fiber. Furthermore, the device has a combined conveyor and holding device for the lengthwise movement of the optical fiber, which works together with the clamping device, which clamps the optical fiber, having the cutting tool and cutting blade.

BRIEF DESCRIPTION OF THE DRAWING

The present invention is described in greater detail in the following on the basis of an exemplary embodiment illustrated in the drawing.

DETAILED DESCRIPTION

Figure 1:
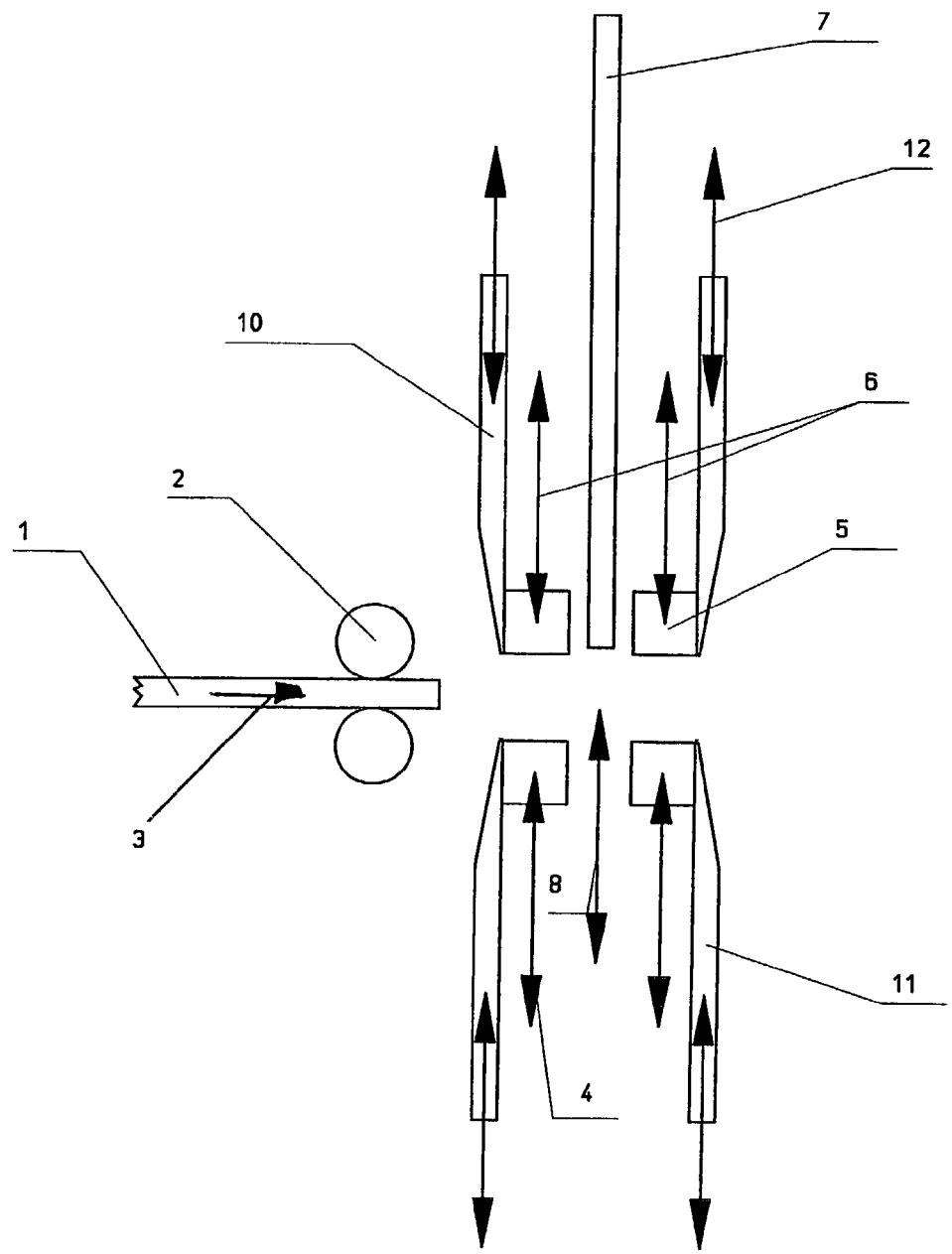
FIG. 1 schematically shows the essential parts of the device in their starting positions, FIG. 2 schematically shows the device having the optical fiber inserted and clamped, FIG. 3 schematically shows the cutting-through procedure with simultaneous machining of the faces, FIG. 4 schematically shows the outer cladding being cut through, FIG. 5 schematically shows the optical fiber being released by the holding device, and FIG. 6 schematically shows the end section of the outer cladding being drawn off of the optical fiber.

The method is schematically illustrated in FIGS. 1 to 6 on the basis of the machine parts required. The movement direction of the individual parts and/or of the optical fiber is indicated by the inset arrows. In the exemplary embodiment, the device is implemented as mirror-symmetric, so that two optical fiber ends may be manufactured simultaneously. The device is shown in its starting position in FIG. 1. Optical fiber 1 is held in combined conveyor and holding device 2 and may be moved to the right into the clamping and cutting parts of the device for the cutting through and machining procedure as indicated by arrow 3. Clamping jaws 4 and 5 are provided for clamping optical fiber 1. Clamping jaws 4 and 5 are to be moved transversely to optical fiber 1, as indicated using arrows 6. Cutting tool 7, which may be moved transversely to optical fiber 1 as shown by arrow 8, is provided between clamping jaws 4 and 5. Cutting blades 10 and 11, which may be moved back and forth in the direction toward optical fiber 1 as indicated by arrows 12, are provided directly next to clamping jaws 4 and 5. A second conveyor and holding device 13 (FIG. 3) is provided on the right side of the figure for receiving optical fiber 1.

Figure 2:
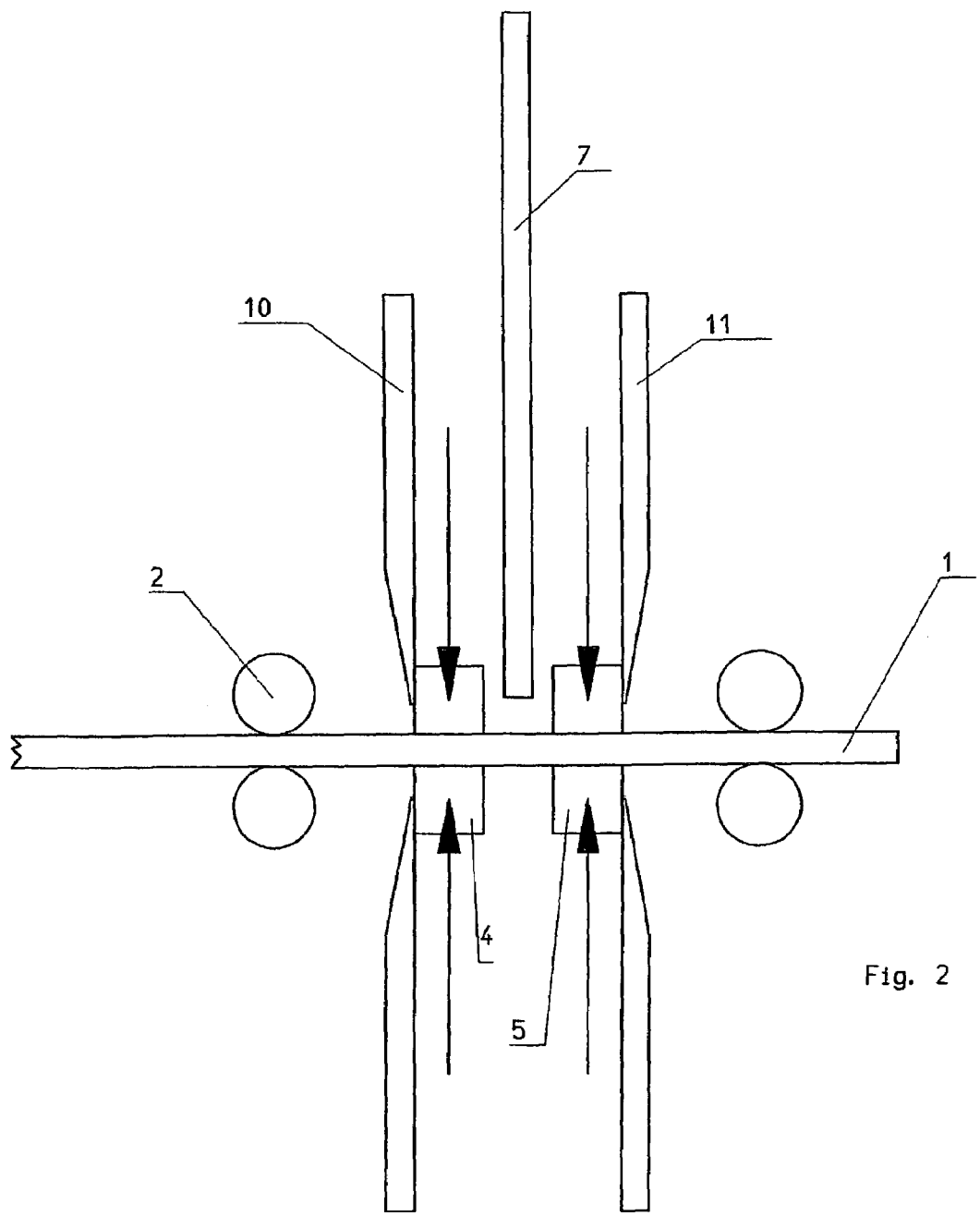

In FIG. 2, optical fiber 1 is inserted by a predetermined length into the device using conveyor and holding devices 2 and 13. Clamping jaws 4 and 5 are closed and are pressed tightly against optical fiber 1. In this way, optical fiber 1 is held in a predetermined position in the device. Sawing and grinding blade 7 and cutting blades 10, 11 are still in their starting positions.

Figure 3:
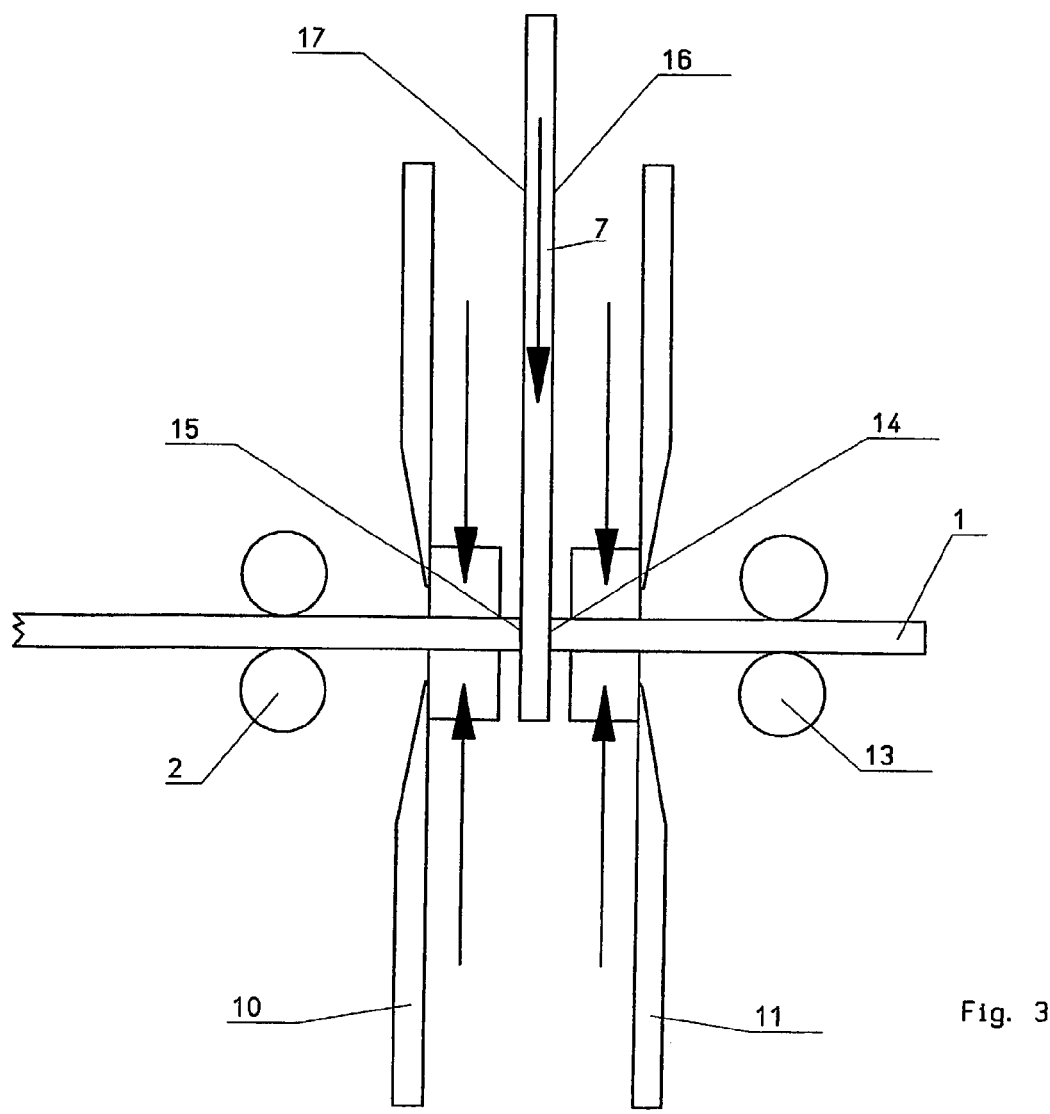

In FIG. 3, the cutting through of the optical fiber using cutting tool 7, with simultaneous fine machining of faces 14 and 15 produced by the cutting through, is completed. A grinding saw blade, which is impregnated on its lateral faces 16 and 17 with diamonds, is used as cutting tool 7. During this procedure, optical fiber 1 is held by the clamping device in clamping jaws 4 and 5. Shaped blades 10 and 11 are still in their starting positions.

Figure 4:
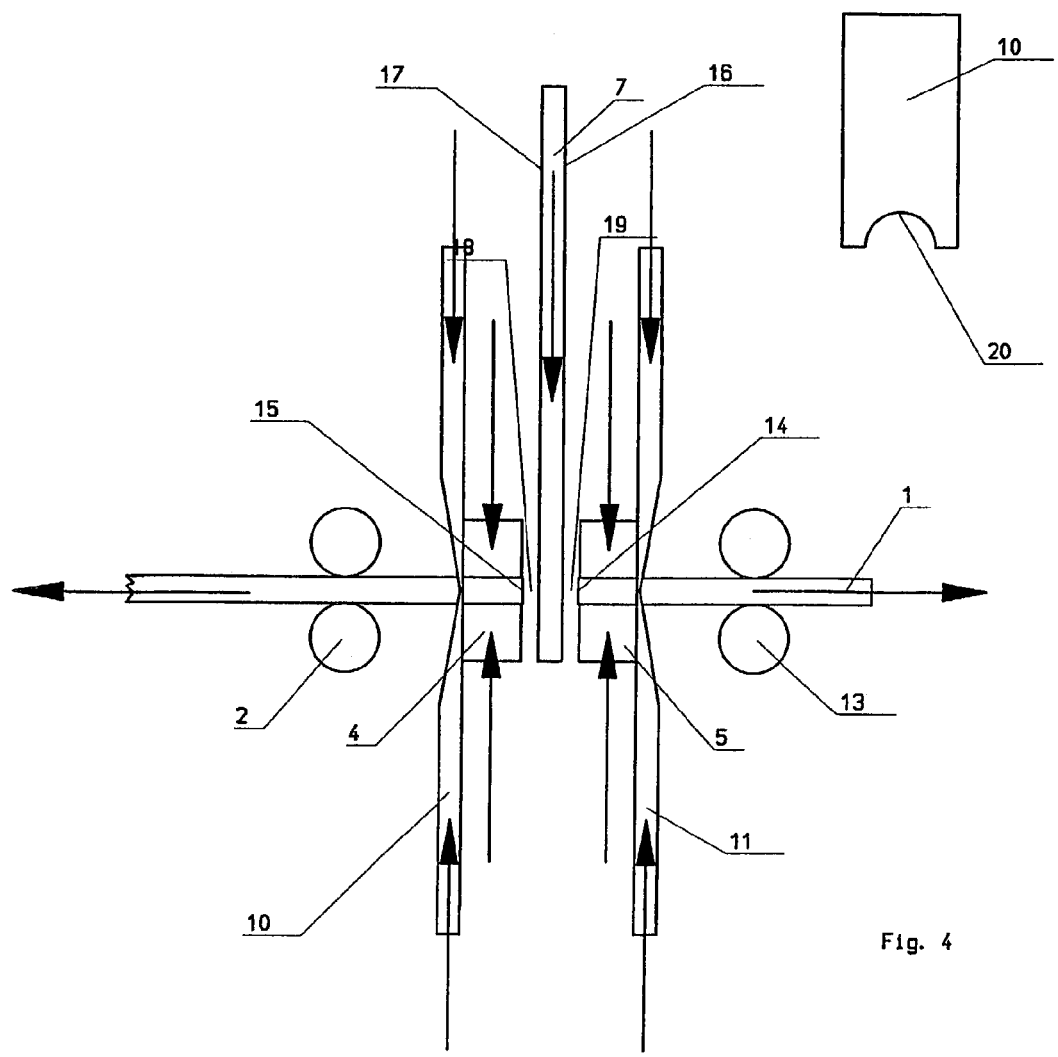

In FIG. 4, shaped blades 10 and 11 are moved in and the outer cladding of the optical fiber is cut through. For this procedure, clamping jaws 4 and 5 are moved outward together with holding devices 2 and 13 and shaped blades 10 and 11, so that free spaces 18 and 19 arise between faces 14 and 15 and particular lateral surfaces 16 and 17 of cutting tool 7. A side view of a shaped blade 10 is shown on the left side of the figure. Cutting edge 20 of cutting blade 10 is implemented as semicircular, having a diameter which corresponds to the external diameter of the inner cladding of optical fiber 1, so that when two cutting blades 10 and/or 11 are pushed together, the outer cladding of optical fiber 1 is cut through completely.

Figure 5:
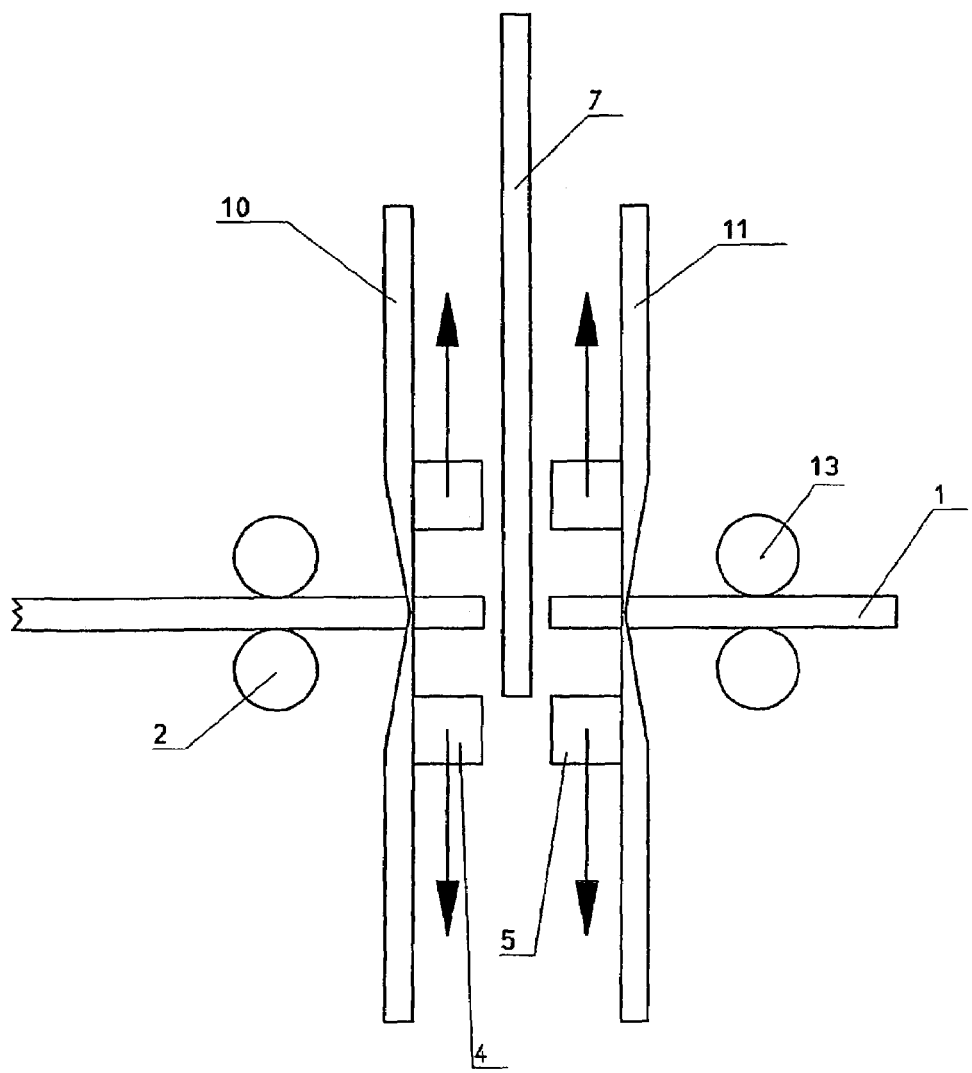

FIG. 5 shows the next method step, in which clamping jaws 4 and 5 of the clamping device are opened. Subsequently, as illustrated in FIG. 6, optical fiber 1 is drawn outward on each side of the device, through which end sections 21 and 22 of the outer cladding, which are held by closed shaped blades 10 and 11, are stripped off of optical fiber ends 23 and 24.

What is claimed is:

1. A method of manufacturing an end of an optical fiber, the end being provided with a face transparent to light waves for attaching a ferrule, the optical fiber having an outer cladding covering an outer surface of the optical fiber, the method comprising the steps of:
    cutting through and mechanically machining the optical fiber so as to form the face, the cutting through of the optical fiber and the mechanical machining of the face being performed as a single work step simultaneously including the cutting through of the optical fiber and mechanically machining of the face so as to finely machine the face; and
    removing an end section of the outer cladding from the optical fiber in a region of the face subsequent to completion of the work step.

2. The method as recited in claim 1 wherein a grinding saw blade is used for cutting through the optical fiber and finely machining the face.

3. The method as recited in claim 2 wherein a diamond-impregnated disk is used as a grinding saw blade.

4. The method as recited in claim 1 wherein the end section of the outer cladding is cut off from the remaining outer cladding and subsequently drawn off of the optical fiber using a shaped blade.

5. The method as recited in claim 4 wherein the end section of the outer cladding is drawn off by a relative movement of the shaped blade and a holding device for the optical fiber in a direction parallel to a longitudinal axis of the optical fiber.

6. The method as recited in claim 1 wherein the end section of the outer cladding is drawn off by a backward movement of a holding device for the optical fiber.

7. The method as recited in claim 1 wherein the optical fiber is an endless optical fiber and further comprising drawing off and cutting to length a section of the endless optical fiber of predetermined length so that the face of the endless optical fiber is formed, as is a second face of the section, both the face and the second face being finished in parallel to one another; and the end section and a second diametrically opposite end section of the outer cladding of the section being drawn off in parallel to one another.

8. A device for manufacturing an end of an optical fiber in accordance with claim 1, the end being provided with a face transparent to light waves for attaching a ferrule, the optical fiber having an outer cladding covering an outer surface of the optical fiber, the device comprising:
    at least one clamping device,
    a cutting tool movable transversely to a lengthwise direction of the optical fiber, the cutting tool having parallel lateral surfaces capable of being guided along the face and another face of a cut-off section of the optical fiber, and
    a device for removing an end section of the outer cladding in the region of the face of the optical fiber.

9. The device as recited in claim 8 wherein the cutting tool is at least one of a milling and grinding tool.

10. The device as recited in claim 8 wherein the cutting tool is capable of being moved back and forth transversely to the lengthwise direction of the optical fiber.

11. The device as recited in claim 8 further comprising a combined conveyor and holding device for the lengthwise movement of the optical fiber and a clamping device for clamping the optical fiber, and the device for removing the end section including a cutting blade.

* * * * *